(12) United States Patent
Mendiola

(10) Patent No.: US 8,315,372 B2
(45) Date of Patent: Nov. 20, 2012

(54) UNIFIED CALL CENTRE SYSTEM FOR MULTIPLE SERVICE PROVIDERS

(75) Inventor: Dennis Mendiola, New York, NY (US)

(73) Assignee: VOXP Pte. Ltd., Singapore (SG)

( * ) Notice: Subject to any disclaimer, the term of this patent is extended or adjusted under 35 U.S.C. 154(b) by 1359 days.

(21) Appl. No.: 11/772,050

(22) Filed: Jun. 29, 2007

(65) Prior Publication Data

US 2008/0112558 A1   May 15, 2008

(30) Foreign Application Priority Data

Jun. 30, 2006 (SG) .................................. 200604452
Apr. 18, 2007 (SG) .................................. 200702869

(51) Int. Cl.
*H04M 3/00* (2006.01)
(52) U.S. Cl. ........... 379/265.09; 379/91.01; 379/114.19; 379/127.04; 379/100.04; 379/114.01; 379/114.04; 379/114.05; 379/114.16; 379/121.02
(58) Field of Classification Search ............ 379/114.13, 379/114.19, 114.2, 114.23, 114.24, 114.26; 705/37, 26.1, 14.64, 39
See application file for complete search history.

(56) References Cited

U.S. PATENT DOCUMENTS

| | | | |
|---|---|---|---|
| 5,799,065 | A | 8/1998 | Junqua et al. |
| 6,829,350 | B1 | 12/2004 | Trinkel et al. |
| 7,333,943 | B1 * | 2/2008 | Charuk et al. ............... 705/26.1 |
| 2002/0095312 | A1 * | 7/2002 | Wheat ............................... 705/1 |
| 2002/0116316 | A1 * | 8/2002 | Griffiths ......................... 705/37 |
| 2002/0120554 | A1 * | 8/2002 | Vega .............................. 705/37 |
| 2005/0171897 | A1 * | 8/2005 | Forsythe et al. ............... 705/37 |
| 2005/0216341 | A1 * | 9/2005 | Agarwal et al. ................ 705/14 |
| 2006/0147006 | A1 * | 7/2006 | Gonen et al. ............. 379/114.11 |

FOREIGN PATENT DOCUMENTS

WO   WO 2006/023959 A2   3/2006

OTHER PUBLICATIONS

International Preliminary Report on Patentability for corresponding International Application No. PCT/SG2007/000189, including the Written Opinion of the International Searching Authority, dated Jan. 6, 2009.

* cited by examiner

*Primary Examiner* — Joseph J Nguyen
(74) *Attorney, Agent, or Firm* — Intellectual Property Law Group LLP

(57) ABSTRACT

In accordance with a first aspect of the invention there is a unified call center system for multiple service providers comprising at least one server; and at least one database in communication with the at least one server. A service provider executes software stored on the at least one server to register an account, the registration process requiring the service provider to enter a predetermined set of information, including at least one identifier for an electronic voice communication device, an additional identifier for an electronic communication device (voice or text) and a personal identifier. After entry of the predetermined set of information, the software generates a unique identifier for the account and communicates the unique identifier and a return destination address for activating the account. The service provider then operates to activate the account by communicating their personal identifier to the return destination address using the electronic communication device. Thereafter, when a caller calls the unified call center system and communicates the unique identifier of the service provider to the unified call center system, the unified call center system operates to establish a call with the service provider by way of one of the at least one electronic voice communication devices and, if able to establish said call, link the caller through to the service provider.

51 Claims, 4 Drawing Sheets

FIGURE 2

- 32
- 34a — SP Registration
- 34b — Service Providers
- 34c — Caller Registration
- Home
- 36 — Registration Form
  - Name:
  - Address:
  - Email:
  - Contact Numbers:
  - Call Charge:
  - Bank Account:
  - Next
- 28

FIGURE 3

- 32
- 34a — SP Registration
- 34b — Service Providers
- 34c — Caller Registration
- Home
- 38
  - Alias:
  - Call Types:
  - Expertise:
  - Call Times:
  - Next — 40
- 28

UNIFIED CALL CENTRE SYSTEM FOR MULTIPLE SERVICE PROVIDERS

CROSS-REFERENCE TO RELATED APPLICATIONS

This application claims priority to Singapore patent application no. 200604452-3, filed Jun. 30, 2006 and Singapore patent application no. 200702869-9, filed Apr. 18, 2007, all which are hereby incorporated by reference.

BACKGROUND OF THE INVENTION

1. Field of Invention

The invention relates to a unified call centre system for multiple service providers. The invention is particularly suited to provide a single call centre system able to handle the requirements of multiple independent service providers, some or all of whom may be individuals.

2. Background

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Current call-centre operations are capital intensive. The call centre operator must invest in sophisticated telecommunications systems to facilitate appropriate handling of the calls. The cost to operate such systems, even on a partial basis, frequently means that only large companies can afford to make use of call centres (either as an internal department or an outsourced service).

It is an object of the present invention to provide a call centre system that can be used by multiple service providers who may range in scale from independent operators to large businesses.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is a unified call centre system for multiple service providers comprising:

at least one server;

at least one database in communication with the at least one server, where, a service provider executes software stored on the at least one server to register an account, the registration process requiring the service provider to enter a predetermined set of information, including at least one identifier for an electronic voice communication device, an additional identifier for an electronic communication device (voice or text) and a personal identifier, and where, after entry of the predetermined set of information, the software generates a unique identifier for the account and communicates the unique identifier and a return destination address for activating the account, the service provider then operable to activate the account by communicating their personal identifier to the return destination address using the electronic communication device such that, when a caller calls the unified call centre system and communicates the unique identifier of the service provider to the unified call centre system, the unified call centre system operates to establish a call with the service provider by way of one of the at least one electronic voice communication devices and, if able to establish said call, link the caller through to the service provider.

The predetermined set of information may also include details of how the call is to be charged (i.e. on a time basis or fixed fee basis). Where appropriate, the unified call centre system thereafter operable to time the duration of the linked call for billing purposes.

The predetermined set of information may also include an alias to be used during all communication with a caller. By using an alias, the service provider may adopt different personas that can be called by way of the unified call centre system.

The predetermined set of information may also include details of time periods when the service provider is available to take calls. When such information is provided, the unified call centre system then checks that the service provider the caller wishes to speak to is available to take calls before trying to contact the service provider.

The predetermined set of information may also include details of the topics and/or expertise of the service provider. The predetermined set of information may also include image files, video files, website links and/or sound files.

The predetermined set of information may be used to generate a template personal information page for the service provider for display by the unified call centre system on a website along with the unique identifier for the service provider. The unified call centre system may allow the service provider to customise their template personal information page.

The electronic voice communication device may be a voice over internet protocol phone, a personal branch exchange, a mobile telephone or a fixed line telephone.

The predetermined set of information must include a primary contact identifier, when more than one contact number is provided. The unified call centre system will then seek to contact the service provider initially by way of the primary contact identifier. If the unified call centre system is unable to contact the service provider by way of the primary contact identifier, the unified call centre system will then rotate through the remaining contact identifiers provided for the service provider in an effort to contact him/her.

The identifier for an electronic communication device may be the unique identifier for a voice over internet protocol communication device, the number of a mobile telephone, the number of a fixed line telephone, an electronic mail address, an instant messaging address; or a short mail system messaging address.

The unified call centre system may further operate to require callers to establish an account with the unified call centre system before making any calls to service providers also registered with the unified call centre system. In registering callers, the unified call centre system may require the caller to enter in their name or alias and details of an electronic payment system associated with that name or alias. The electronic payment system may be a credit card or other system, such as PayPal™.

Alternatively, the unified call centre system may require the caller to provide their name or alias and details of an electronic payment system associated with that name or alias prior to linking the caller with the service provider they wish to call.

Upon establishing contact with a service provider, and before linking the caller through to the service provider, the unified call centre system operates to inform the service provider of the alias of the service provider the caller has sought to speak with.

Also before linking the caller through to the service provider, the service provider may be required to communicate to the unified call centre system their personal identifier as a means of verifying their identity.

At the end of the call between a caller and a service provider, the unified call centre system may send a communication message to the service provider and/or the caller informing them of details of the call, such as duration, cost, etc.

After completion of the call, the caller may be requested to provide feedback on the service provider. This feedback may then be included as part of the template personal information of the service providers.

Also after completion of the call, the service provider may be requested to provide feedback on the caller. This feedback may be used by future service providers to determine whether to block or refuse to take calls from a caller.

These respective feedback system may then be used to determine whether the accounts of a caller or service provider should be de-activated due to negative feedback.

The unified call centre system may be adapted to provide for simulcasts by service providers with video being provided by way of the service provider's information page displayed on the website.

The unified call centre system may provide access controls in respect of callers. For example, access controls may be provided to prevent under-age callers from calling service providers who provide adult services.

In accordance with other aspects of the invention, there is:
a server for use in a unified call centre system as described in the first aspect of the invention;
software stored on a pre-recorded medium for operating a unified call centre system as described in the first aspect of the invention;
a method of operating a unified call centre system.

BRIEF DESCRIPTION OF THE DRAWINGS

The invention will now be described, by way of example only, with reference to the accompanying drawings, in which:

FIG. 2 is a first screen shot of a website that forms part of the unified call centre system shown in FIG. 1.

FIG. 3 is a second screen shot of a website that forms part of the unified call centre system shown in FIG. 1.

DETAILED DESCRIPTION OF SPECIFIC EMBODIMENTS

Figure 1:
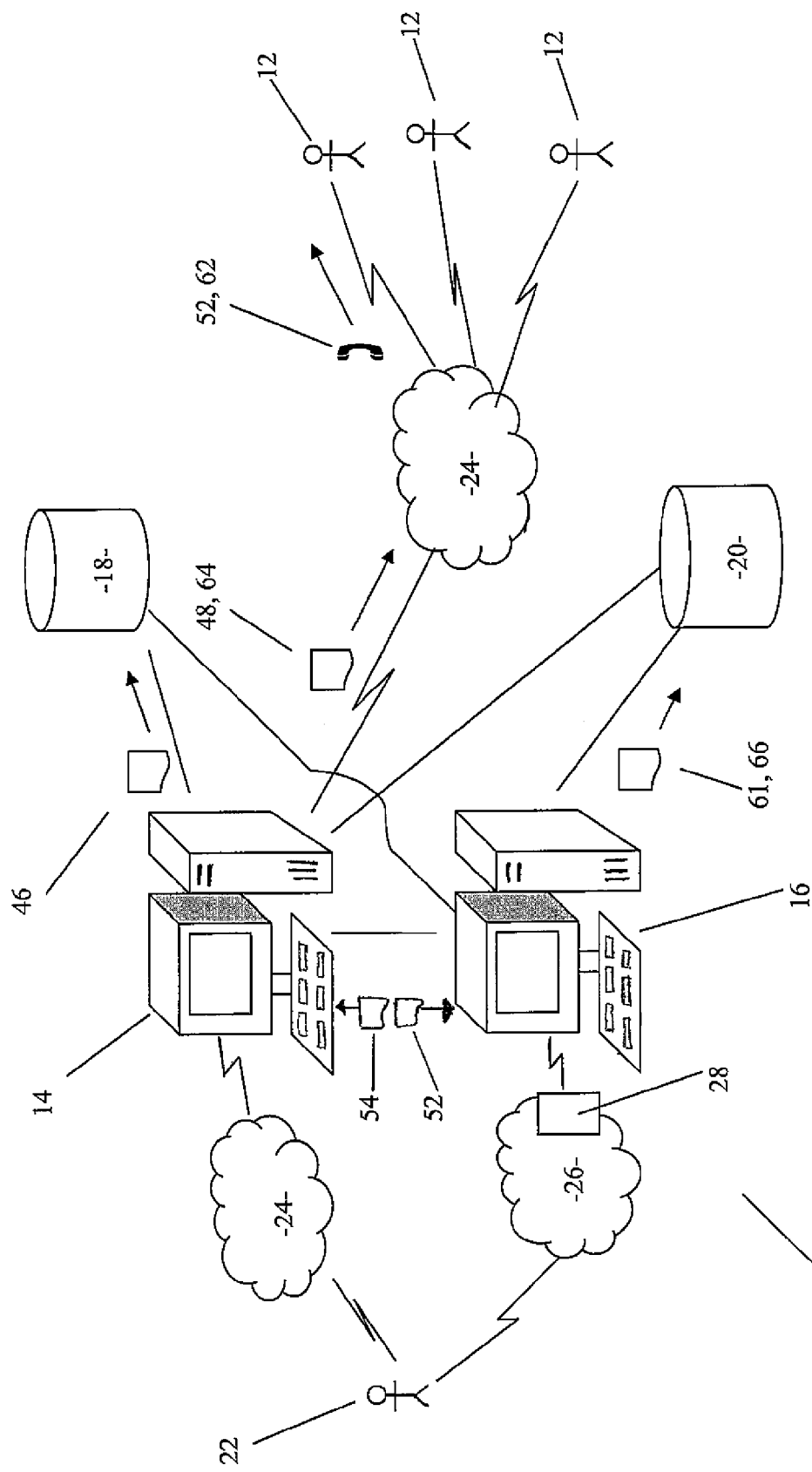
FIG. 1 is a schematic representation of a unified call centre system 10 according to a first embodiment of the invention.
Figure 4:
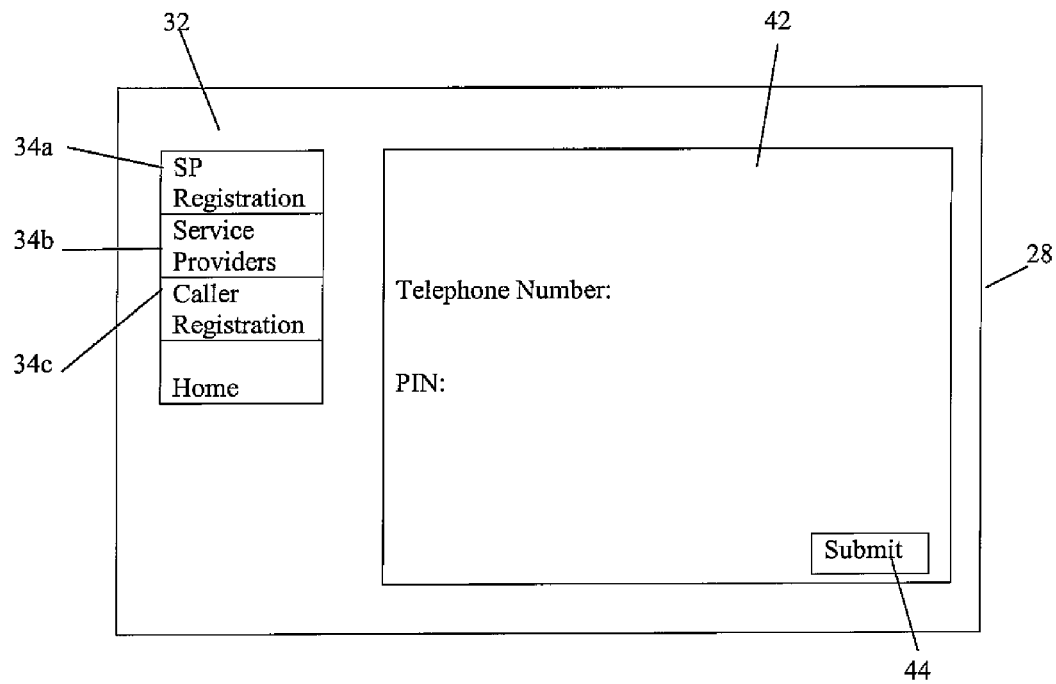
FIG. 4 is a third screen shot of a website that forms part of the unified call centre system shown in FIG. 1.
Figure 5:
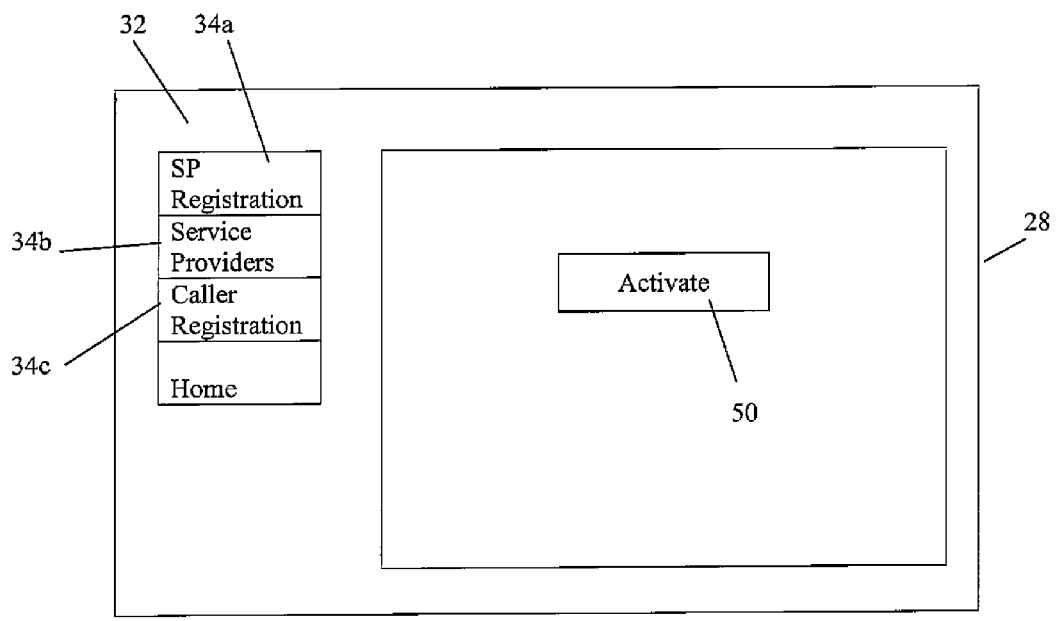
FIG. 5 is a fourth screen shot of a website that forms part of the unified call centre system shown in FIG. 1.
Figure 6:
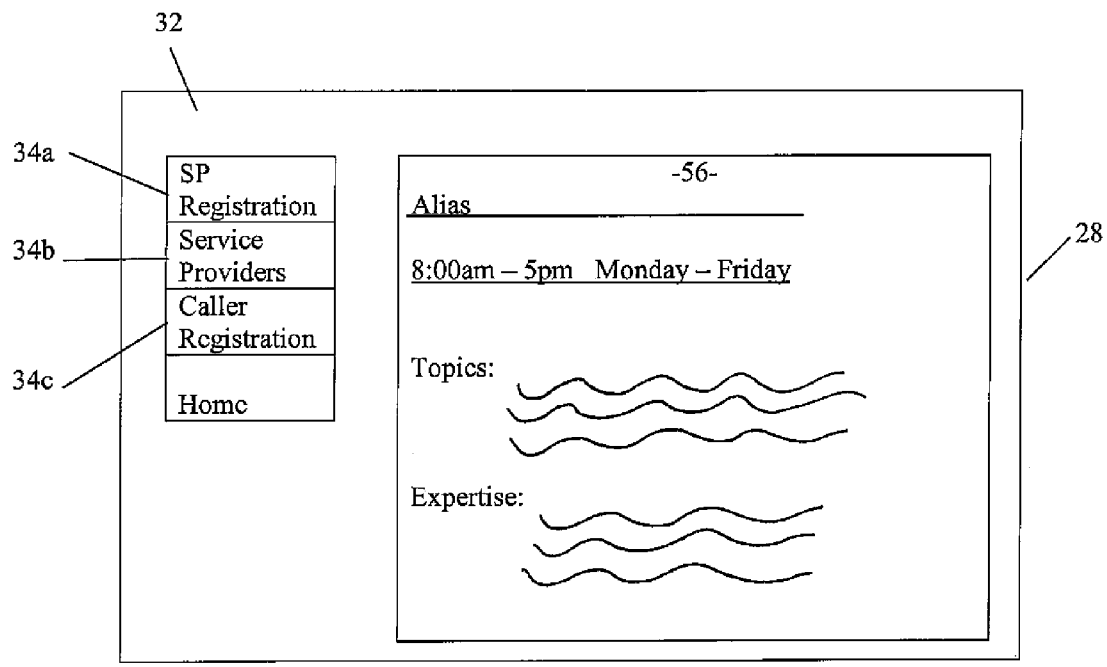
FIG. 6 is a fifth screen shot of a website that forms part of the unified call centre system shown in FIG. 1.
Figure 7:
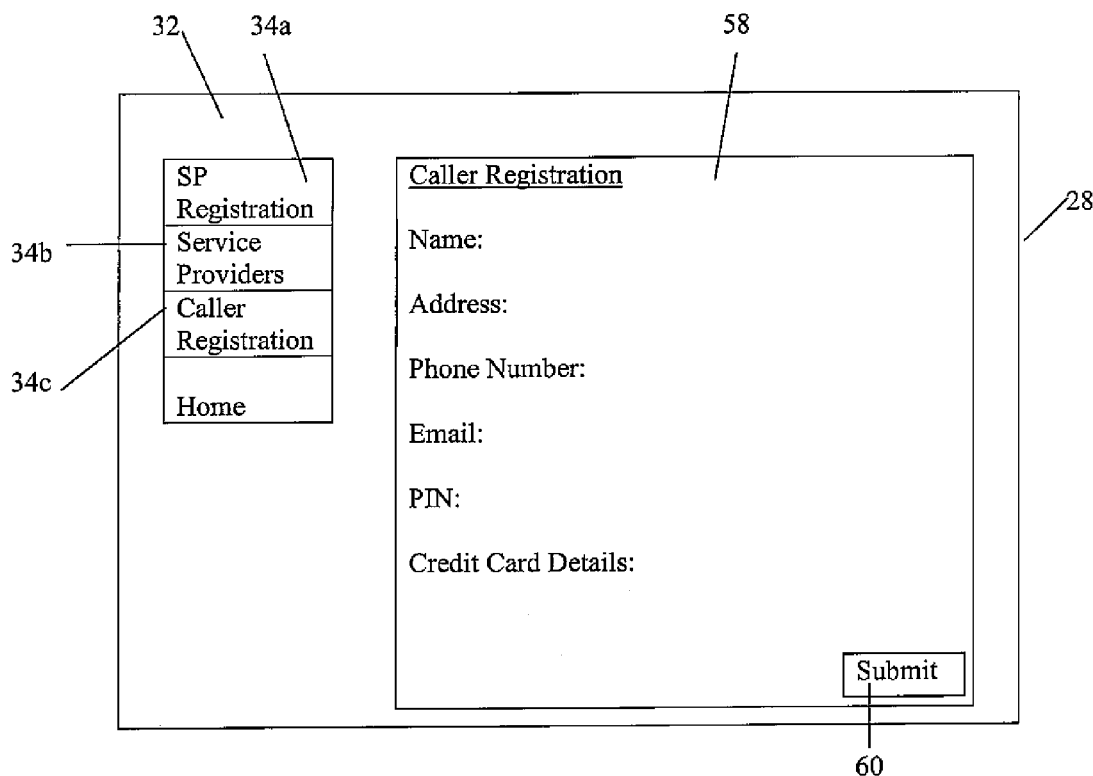
FIG. 7 is a sixth screen shot of a website that forms part of the unified call centre system shown in FIG. 1.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

In accordance with a first embodiment of the invention there is a unified call centre system 10 for multiple service providers 12. The unified call centre system 10 comprises:
a call centre server 14;
a web server 16;
a service provider database 18; and
a caller database 20.

The call centre server 14 is able to communicate with service providers 12 and callers 22 through at least one telecommunication network 24. The call centre server 14 is also in direct communication with the web server 16, the service provider database 18 and the caller database 20.

In addition to being in direct communication with the call centre server 14, the web server 16 is in direct communication with both the service provider database 18 and the caller database 20.

The web server 16 is able to communicate with callers 22 through the internet 26. To facilitate this communication the web server 16 operates a website 28.

The invention will now be described in the context of its intended use.

A service provider 12 initiates a web-browser program to connect to the internet. Through the internet connection, the service provider 12 accesses the website 28.

The website 28 presents the service provider 12 with a menu of options 32. By selecting the "SP Registration" icon 34a from the menu of options 32, the service provider 12 can register to provide services through the call centre system 10. In this case, after selecting the "SP Registration" icon 34a, the website 28 changes to display a registration form 36 to the service provider 12.

The registration form 36 requires the service provider 12 to provide at least the following information:
their legal name;
their street address;
their e-mail address. The significance of this will become apparent later.
at least one contact number. The contact number may be the telephone number of a mobile telephone or a fixed line telephone in the service provider's 12 possession. Where more than one contact number is given, the service provider 12 must designated one of the contact numbers as their primary contact number.
the amount they wish to charge per call received. This may be a fixed charge to the caller 22 or it may be calculated on a pro rata basis.
their bank account information. This information is required to credit the service provider 12 with a portion of the payment received from their callers 22.

Once the service provider 12 has entered in the above mandatory information, the website 28 changes to display a "blog" form 38 to the service provider 12. The "blog" form 38 requests the service provider 12 to enter in additional optional information which will be used by the web server 16 to provide information to callers 22 about the service provider 12 and by the call centre server 14 to screen calls made to the service provider 12. This information includes:
Alias. This is the name or "personality" to be adopted by the service provider 12 when providing services through the call centre system 10. If the service provider 12 does not provide an alias, the call centre system 10 will operate on the presumption that the service provider 12 wishes to use their legal name when providing services through the call centre system 10.

Call Types. In this section the service provider 12 provides a description of the types of calls and topics he/she is willing to answer from callers 22. This may be a written description authored by the service provider 12 themselves. More common call types and topics may be added by selection from a drop down list.

Expertise. The service provider 12 provides a summary résumé of his/her experience and other information to assist the caller 22 in determining whether the service provider 12 is the person they should be speaking too via the call centre system 10.

Call Times. Here the service provider 12 specifies the time periods they are available to take calls. The time periods may differ depending on the day of the week.

Once the service provider 12 has entered in as much of the above optional information as they desire to do so, they activate action button 40. On activation of the action button 40, the website 28 changes to display a final registration form 42.

The final registration form 42 requests the service provider 12 to enter in a telephone number and a personal identification number (PIN). By selecting a check box (not shown), the service provider 12 can automatically fill in the telephone number details with their primary contact number (as entered in the registration form 36). Registration is then finalised by activating the submit action button 44.

On activation of the submit action button 44, the web server 16 compiles all of the entered information received from the service provider 12 into a service provider record 46. The service provider record 46 is then communicated to the service provider database 18 for storage and future reference.

At the same time, the web server 16 generates an e-mail 48 with the information that forms the service provider record (in an appropriately formatted fashion for ease of reference). Appended to the e-mail 48 is also a unique identifier generated by the web server 16 and instructions on how to activate their account and the URL of that portion of the website 28 that allows for activation of accounts. The e-mail 48 is then sent to the service provider 12 by way of the e-mail address they entered in the registration form 36.

Upon receiving the e-mail 48, the service provider 12 checks the information they have entered to confirm that it is correct. Once so confirmed, the service provider 12 clicks on the URL provided in the e-mail 48 to access that portion of the website 28 that allows for activation of accounts. Activation can then be finalised, from a service provider 12 interaction perspective, by activating the activate action button 50.

Activation of the activate action button 50 causes the web server 16 to send a control signal to the call centre server 14 to initiate a call 52 to the service provider's 12 main contact number (again, as entered in the registration form 36).

As part of the process of initiating the call 52 to the service provider's 12 main contact number, the service provider 12 is provided with an automated voice message as follows:

"Hello [Service Provider]. We are finalising your membership. Please enter your PIN followed by the # sign."

Where, in this message, the phrase [Service Provider] is replaced with the service provider's 12 alias, if provided. If no alias is provided, the phrase [Service Provider] is replaced with the service provider's 12 legal name.

Following announcement of the automated voice message, the service provider 12 enters into their telephone the PIN that they designated in the final registration form 42.

Using techniques as would be known to the person skilled in the art, the call centre server 14 translates the signals generated by the service provider 12 in entering their PIN into a numerical value. The call centre server 14 then sends a command signal 52 back to the web server 16 which includes the numerical value and the phone number of the service provider 12 called. The web server 16 then cross-references the command signal 52 values with those stored in the service provider database 18. If a match is found the corresponding service provider record 46, as stored in the service provider database 18, is designated as active. At the same time, the web server 16 sends a return command signal 54 to the call centre server 14 instructing the call centre server 14 to inform the service provider 12 that their account with the call centre system 10 is now active.

On designating a service provider record 46 as active, the web server 16 operates to generate a template personal information page 56 for the service provider 12.

A caller 22 wishing to access the services provided by a service provider 12 registered with the call centre system 10 then accesses the website 28 through their own web browser (not shown). By selecting the "Service Providers" icon 34b from the menu of options 32, the caller 22 may browse the personal information pages 56 of the various service providers 12—each generated from the service provider's template personal information page 56. Alternatively, the caller 22 may seek information in respect of a particular service provider 12 by entering in the service provider's 12 alias (or real name if no alias) in the search box provided (not shown). On matching the entered text with the alias or real name of an activated service provider 12, the website 28 changes to display the personal information page 56 of that service provider, as generated from the service provider's 12 template personal information page 56.

Regardless, in each case the service provider's 12 generated personal information page 56 also includes their unique identifier (as communicated to the service provider 12 by way of e-mail 48).

Upon determining the service provider 12 that the caller 22 wishes to call, the caller 22 records the unique identifier as stated on the service provider's 12 generated personal information page 56 and selects the "Caller Registration" icon 34c from the menu of options 32.

On selection of the "Caller Registration" icon 34c, the website 28 changes to display a caller registration form 58 to the caller 22. The caller registration form 58 requires the caller 12 to provide at least the following information:

their legal name;
their mailing address;
their phone number;
their e-mail address;
a personal PIN; and
their credit card details or other electronic payment facility, such as that provided by PayPal Inc. under the trademark PayPal.

On completion of the caller registration form 58, the caller 22 establishes their account by activating the submit action button 60. On activation of the submit action button 60, the web server 16 collates the information entered as part of the caller registration form 58 into a caller record 61. The caller record 61 is then forwarded to the caller database 20 for storage and future reference.

With the caller 22 having an activated account with the call centre system 10, the caller 22 may now call any of the service providers 12 registered with the call centre system 10.

To do this, the caller 22 rings a dedicated phone line established for the call centre system 10. This connects the caller 22 to the call centre server 14. Upon connection, the call centre server 14 plays to the caller 22 the following as an interactive voice recording:

"Hello [Caller]. Who would you like to speak to today? Please enter the person's unique identifier followed by the # sign"

Where, in this recording, the phrase [Caller] is replaced with the caller's 22 real name. The caller's 22 real name is identified by matching the phone number used to make the call (as determined by standard caller identification techniques) to phone numbers that form part of the caller records 61 stored in the caller database 20. The matched caller record 61 is also stored in the memory of the call centre server 14 for future reference.

The caller 22 then enters the unique identifier of the service provider 12 they wish to contact. The unique identifier is processed in the same manner as the other PINs referred to above. A validation check is then performed by the call centre server 14 to ensure that the unique identifier entered corresponds with an actual service provider 12.

On verifying that the unique identifier entered corresponds with an actual service provider 12, the call centre server 14 checks to see whether the service provider 12 has set time periods during which they will accept calls. If so, and the call is made outside of these time periods, the caller 22 is played an interactive voice recording informing them of this fact and terminating the call. Otherwise, the call centre server 14 proceeds further with the call by playing the following as a further interactive voice recording:

"Now please enter your PIN followed by the # sign"

The caller 22 then enters their PIN which is processed as already described. The entered PIN is then cross-referenced with the PIN of the caller 22 as recorded in their caller record 61 (now stored in the memory of the call centre server 14). If a match is found through this cross-reference, the call centre server 14 initiates a linking call 62 to the appropriate service provider 12 by way of their primary contact number.

In the event that the service provider 12 can not be contacted by way of their primary contact number, the call centre server 14 will terminate this initial linking call 62 and seek to establish, in turn, additional linking calls 62 to the other contact numbers the service provider 12 has recorded as part of their service provider record 46. If the service provider 12 does not answer on any of the contact numbers recorded as part of their service provider record 46, the caller 22 is put on hold and given an estimate as to how many minutes before their call is answered by the service provider 12 (where possible to do so).

However, if the service provider 12 is able to be contacted on any of their contact numbers, the call centre server 14 plays to the service provider 12 the following as an interactive voice recording:

"Hello [Service Provider]. [Caller] is trying to reach you. Please reply with your PIN followed by the # sign to take the call."

Where, in this recording, the phrase [Service Provider] is replaced with the alias or legal name of the service provider 12. In this manner, if the service provider 12 operates a number of accounts under different aliases, they are able to identify which alias the caller 22 is seeking to speak with. Similarly, the phase [Caller] is replaced with the caller's 22 real name.

The service provider 12 then enters their PIN. The PIN is processed in the same manner as the other PINs referred to above. A validation check is then performed by the call centre server 14 to ensure that the PIN entered corresponds with the PIN of the service provider 12 the caller 22 wishes to speak with.

If the validation check is successful, the caller 22 is then patched through to the service provider by way of the linking call 62. At this point, the call centre server 14 starts timing the call. This continues until the call is terminated by either the caller 22 or the service provider 12.

On termination of the call, the call centre server 14 generates two e-mail messages 64, 66. The first e-mail message 64 is sent to the service provider 12 and provides a summary of the call. This summary includes at least the following information:

the real name of the caller 22;
the alias, or real name if no alias, of the service provider 12;
the time and date of the call;
the duration of the call;
the rate for the call; and
the approximate earnings for that call.

The second e-mail message 66 is sent to the caller 22 and also provides a summary of the call.

This summary includes at least the following information:
the real name of the caller 22;
the alias, or real name if no alias, of the service provider 12;
the time and date of the call.
the duration of the call;
the rate for the call; and
the total cost of the call.

After sending the second e-mail message 66, the call centre server 14 then operates to determine the cost of the call. This is achieved by multiplying the duration of the call by the cost per time period in the case of pro rata calls. The call centre server 14 then charges the total cost of the call against the credit card or electronic credit facility detailed by the caller 22 in their caller record 61.

In accordance with a second embodiment of the invention (not shown), where like numerals reference like parts, the first embodiment of the invention is supplemented with a feedback mechanism. The feedback mechanism activates upon termination of a call by the service provider 12. Once terminated, the caller 22 is redirected to the call centre server 14. The call centre server 14 then operates to play a feedback message to the caller 22. In response the caller 22 enters into their telephone the appropriate code representative of the feedback they wish to leave in respect of the service provider 12. Again, using techniques as would be apparent to the person skilled in the art, the call centre server 14 operates to convert the signal received representative of the feedback they wish to leave in respect of the service provider 12 to a more appropriate value. This value, and the service provider's 12 identity, is then sent to the web server 16 for association with the service provider record 46. This association takes the form of a record (not shown) storing a current tally of the various feedback values and the number of times a caller 22 has provided such a feedback value in respect of the associated service provider 12.

This record is also referenced each time the service provider's 12 information page 56 is generated from the template so that callers 22 may also view details of the feedback provided in respect of the service provider 12. In this manner, using the feedback provided as a reference, they may make an appropriate decision on the value of the service provider's 12 services before calling them through the call centre system 10.

In accordance with a third embodiment of the invention (not shown), where like numerals reference like parts, the first embodiment of the invention is modified such that payment is made in the form of mobile phone credit.

As an optional component to the system of this embodiment, the unified call centre system is supplemented with a credit exchange system. The credit exchange system operates to determine what a unit of mobile phone credit held with one telecommunications carrier equates to in mobile phone credit held with another telecommunications carrier. In doing so, the credit exchange system must take into account such factors as:

the differences in currencies that the two telecommunications carriers operate under (if any) and the impact of foreign currency exchange on such currencies;

the devaluation of such airtime credit caused by promotional activities run by the telecommunications carrier of the user (for example, a user making a payment of $30 to receive $50 worth of mobile phone credit may devalue a $1 unit of phone credit provided by that telecommunications carrier to 60c).

The call establishment and call termination fees levied by the respective telecommunications carriers.

The commission amount set or fee charged, if any, by the respective telecommunications carriers to allow for the transfer and/or receipt of the mobile phone credit.

Whether the carrier offers a variety of air-time credit products and, if so, the values to be allocated in the exchange of each such products.

In accordance with a fourth embodiment of the invention, where like numerals reference like parts, there is a mobile-phone based retailing system. The mobile-phone based retailing system will now be described in the context of the following examples.

In this first example, the template personal information page 56 of a service provider 12 is updated to include a series of downloadable goods and/or services that the service provider 12 offers. Each downloadable good and/or service has a "BUY" action button associated therewith. Furthermore, while not displayed to viewers of the template personal information page 56, each downloadable good and/or service has a first code associated therewith. The first code provides details of:

the service provider;
the type of service or downloadable good being offered;
whether the service of downloadable good will be offered in real-time or will be offered by way of download; and
the cost of the downloadable good or service.

On a caller pressing the "BUY" action button associated with a downloadable good and/or service, the caller is asked to identify him- or her-self. Identification is confirmed when the caller provides details of him- or her-self that corresponds with a record included in a caller record 61. Once so identified, the call centre server 14 is requested to connect the identified caller with the service provider 12 and provided with the associated first code for the downloadable product or service. The appropriate service provider 12 to contact to the caller is determined by the associated first code of the downloadable good or service being purchased.

Once connected, the call centre server 14 operates to determine, from the first code whether the downloadable good or service is to be provided in real-time or by way of download. If the former, the call centre server 14 operates to provide the downloadable good or service as part of the connected call. If the latter, the call centre server 14 operates to send the downloadable good to the mobile phone of the caller using techniques as would be known to the person skilled in the art. In the case of a service to be provided by way of download, an access code and instructions on how to redeem the service is provided by way of a messaging system available to the caller's mobile phone.

In a second example, the template personal information page 56 of a service provider 12 is updated to include a series of downloadable goods and/or services that the service provider 12 offers. Each downloadable good and/or service has a "BUY" action button associated therewith. Furthermore, while not displayed to viewers of the template personal information page 56, each downloadable good and/or service has a first code associated therewith. The first code provides details of:

the service provider;
the type of service or downloadable good being offered;
whether the service of downloadable good will be offered in real-time or will be offered by way of download; and
the cost of the downloadable good or service.

On a caller pressing the "BUY" action button associated with a downloadable good and/or service, the caller is asked to identify him- or her-self. Identification is confirmed when the caller provides details of him- or her-self that corresponds with a record included in a caller record 61. Once so identified, the call centre server 12 is requested to send a message to the mobile phone recorded as in the caller's possession in their caller record 61 using a messaging system as such mobile phone is capable of receiving. Ideally, this text message comes from a phone number consisting of a short code and the first code. The message asks the caller to confirm the purchase of the appropriate downloadable good or service.

The caller then replies to the message. If the caller's reply indicates that they wish to proceed with the purchase of the appropriate downloadable good or service (i.e. by texting "YES" in reply). The call centre server 12 then processes the reply to verify affirmation of the purchase and, if so affirmed, to identify from the destination address of the message the first code. On identifying the first code, the first code is assessed to determine whether the downloadable good or service is to be provided in real-time or by way of download. If the former, the call centre server 14 operates to provide the downloadable good or service as part of a new call connected between service provider and caller. If the latter, the call centre server 14 operates to send the downloadable good to the mobile phone of the caller using techniques as would be known to the person skilled in the art. In the case of a service to be provided by way of download, an access code and instructions on how to redeem the service is provided by way of e-mail to an e-mail address of the caller as specified in their caller record 61.

In accordance with a third example, the caller texts a message in a predefined format to an access code using their registered mobile phone. The access code, being associated with the call centre server, causes the call centre server to parse the predefined format to identify the downloadable good or service that the caller wishes to purchase.

On identifying the downloadable good or service, as assessment is made on whether the downloadable good or service is to be provided in real-time or by way of download. If the former, the call centre server 14 operates to provide the downloadable good or service as part of a new call connected between service provider and caller. If the latter, the call centre server 14 operates to send the downloadable good to the mobile phone of the caller using techniques as would be known to the person skilled in the art. In the case of a service to be provided by way of download, an access code and instructions on how to redeem the service is provided by way of e-mail to an e-mail address of the caller as specified in their caller record 61.

It should be appreciated by the person skilled in the art that the above invention is not limited to the embodiment described. In particular, the following modifications and improvements may be made without departing from the scope of the present invention:

the web server 16 and call centre server 14 may in fact be a cluster of servers. Similarly, the service provider database 18 and caller database 20 may in fact be tables of records forming part of a unitary database.

the web server 16 may be integrated into the call centre server 14.

the service provider's 12 unique identifier may be numeric or alphanumeric. In its alphanumeric form, letters may be represented as multiple quick succession depresses of numeric keys on the telephone as would be known to the person skilled in the art. Yet alternative methods of representing both numeric and alphanumeric unique identifiers are considered to be well within the skills of the person skilled in the art.

The service provider database 18 and the caller database 20 may be separately or collectively integrated into either the web server 16 or the call centre server 14.

The service provider 12 may be requested as part of the "blog" form 38 to provide other items such as images, video or sound files that may be included as part of the service provider's 12 information page 56. The service provider 12 may also be prompted to provide links to other websites which will also be included as part of the service provider's 12 information page 56.

In alternative configurations, a contact number provided by a service provider 12 may be a PABX which can then forward the relaying and farming of calls to the appropriate person within the service provider. In yet further alternatives, the contact number may be any electronic voice communication device. In this manner, communication may be facilitated through Voice Over Internet Protocol, or like, services.

Activation of a service provider's 12 account may be facilitated by way of a text message in place of a telephone call. However, the content of the activation message delivered will not change regardless of the method used to convey that message.

The call centre system 10 may provide web publishing tools that allow the service provider 12 to modify their template personal information page 56.

Access controls may be implemented as part of the call centre system 10 by requiring the caller 22 to also enter in other details as part of the registration process. For example, if the caller 22 is not of a certain age, the caller may be prevented from calling service providers 12 who provide certain types of calls or topics.

The call centre system 10 may be further customisable by the service provider 12 to allow for a simultaneous phone call and video broadcast by way of the service provider's personal information page 56.

In variations of the second embodiment, service providers 12 may also be able to rate callers 22. This rating information can then be provided to future service providers 12 before deciding whether to accept a call from that caller.

Service providers 12 may be able to block calls from certain callers 22.

In yet a further variation of the second embodiment, callers 22 may be provided with a unique feedback code at the end of their call to a service provider 12. This caller 22 can then access the website 28 and enter a feedback section thereof where feedback can be left by reference to the unique feedback code. The caller 22 may be reminded to leave feedback when they next access their account, if feedback is not immediately left.

The service provider 12 is not limited from advertising their unique code for the call centre system 10 to callers 22 through the website 28.

The caller 22 may also adopt an alias. In such circumstances, communication between the caller 22 and the service provider 12 may refer to the caller by the alias. Where the alias is also the reference used by the electronic payment facility, the caller 22 also need not give their legal name (which is otherwise required when dealing with credit cards).

In another alternative system, the caller database 20 may not be required. In its place, the caller 22 provides pre-call information, including their name and payment facility details, before being placed in contact with their requested service provider 12.

The credit card payment system and electronic payment system may be replaced with a pre-paid card system as is presently used in some countries to pay for mobile telephone calls.

The caller 22 may be able to bypass the interactive voice message requesting the unique identifier of the service provider 12 they wish to speak to, by calling a short code or area code with the unique identifier of said service provider 12 as a suffix thereto. In this case, the phone line assigned the short code would replace the dedicated phone line referred to above.

The system may flag callers 22 or service providers 12 who have a positive feedback rating below a pre-determined amount for review by another system or operator to determine whether said the caller's 22 account or service provider's 12 account should be de-activated.

E-mail message 48 may be replaced with a voice message or alternative text message (such as an SMS message). In such instances, the information conveyed does not change.

Phone call 52 may be replaced with a text message. Again, in this instance the information conveyed does not change.

If the system 10 is not able to contact a service provider 12 using their designated contact numbers, the system may operate to send a message to the service provider 12 using non-voice techniques. For instance, a message may be sent to the service provider 12 by way of their e-mail address or pager. The message will inform the service provider 12 that they have a call from a caller 22 and that they can access this call by phoning a set phone number and entering in the unique number included as part of the message. Once the service provider 12 calls the number and enters the unique number, they will then be processed as if the initial linking call 62 was successful in contacting the service provider 12.

The credit exchange system may be adapted such that the unit of mobile phone credit traded on the exchange system is a "per minute" unit of airtime use rather than a monetary value.

The credit exchange system may be further adapted to allow for mobile phone credit to be converted back to traditional currency for depositing into a bank account, credit card or other form of monetary account. With such a system in operation, the caller may opt to pay via mobile phone credit while the service provider may opt to receive payment in the form of traditional currency with the credit exchange system intervening to effect the transformation of payment between the two parties.

The system 10 may be further modified to allow the service provider 12 to have a single account. This single account may hold all the information required for all of the multiple aliases the service provider 12 maintains through the system 10.

The feedback mechanism may be routed through a service provider or caller's account. In this manner, when a caller or service provider logs onto the system there will be a list of service providers/callers that have not been rated and the caller/service provider will be asked if they wish to rate such people then and there.

The instructions provided to a caller to download a downloadable good or service may include details of an additional website or phone number that they must contact in order to download the good or service.

There is no requirement under this system for the service provider 12 to be "live" in the provision of the service. Once a price has been determined, the service may, for example, take the form of a pre-recorded message.

Rather than receiving a completely impersonal automated voice message, automated messages may, during setup of a caller or service provider's account, record the caller or service provider, as appropriate, saying their name. This voice recording can then be included by the interrupt payment system 100 and/or the call centre system 10 as part of a voice message delivered to the caller or service provider as appropriate.

The access code provided to a caller may be unique to the caller. In this manner, the call centre server sets up a reference list of access codes for each caller. When the caller sends a message to the call centre server, they are then identified by way of their mobile phone number and any suffixed access code (or access code included in the message) is checked against the reference list to determine the downloadable good or service associated with the message. This is a particularly advantageous system in situations where the telecommunications carrier used by the call centre server has limitations on the length of the access code.

The system of the prior paragraph also allows access codes to "expire" by updating the reference list at the time of expiry so as to point to either:
another downloadable good or service;
a predefined error message notice; or
nothing at all.

In a further alternate configuration the interrupt payment system may actually function as two separate PABXs. The first PABC operates to receive calls and the other operates to place calls to service providers. This configuration provides for an easier way to allow the system to identify which party has triggered the interrupt payment system.

It should be further appreciated by the person skilled in the art that the features described above, where not mutually exclusive, can be combined to form yet further embodiments of the invention.

I claim:

1. A unified call centre system for multiple service providers comprising:
at least one server;
at least one database in communication with the at least one server,
where, a service provider executes computer-executable instructions stored on the at least one server, which cause the system to register an account, the registration process requiring the service provider to enter a predetermined set of information, including
at least one identifier for an electronic voice communication device,
an additional identifier for an electronic communication device (voice or text) and a personal identifier, and where, after entry of the predetermined set of information, the computer-executable instructions cause the system to generate a unique identifier for the account and communicates the unique identifier and a return destination address for activating the account, the service provider then operable to activate the account by storing the predetermined set of information in the at least one database and communicating the personal identifier of the service provider to the return destination address using the electronic communication device such that, when a caller calls the unified call centre system and communicates the unique identifier of the service provider to the unified call centre system, the unified call centre system
references the predetermined set of information,
verifies one or more time periods during which the service provider is able to take calls, and
operates to establish a call with the service provider by way of one of the at least one electronic voice communication devices and,
if able to establish said call, link the caller through to the service provider, where the caller being required to make a payment of an appropriate charge set by the service provider on termination of the linked call, and where, when a method of payment designated by the caller is by mobile phone credit, the unified call centre system includes a credit exchange system to equate a credit or air-time of the caller's telecommunication carrier with a credit or air-time of the service provider's telecommunication carrier.

2. A unified call centre system as claimed in claim 1, where the unique identifier is equal to, or derived from, the personal identifier.

3. A unified call centre system as claimed in claim 1, where the caller is required to register themselves with the unified call centre system prior to being able to make calls to service providers.

4. A unified call centre system according to claim 3, where registration of the caller requires the caller to identify a method of payment from one of the following: credit card, mobile phone credit, pre-paid card credit or other electronic payment system, the unified call centre system operable to debit the designated method of payment the amount of the charge on termination of the linked call.

5. A unified call centre system according to claim 3, where the information provided by the caller during the registration process is used to impose access controls on the caller's use of the unified call centre system.

6. A unified call centre system according to claim 3, where the caller is able to specify an alias by which they will be known to the service providers during the linked call.

7. A unified call centre system according to claim 1, where the service provider is able to specify an alias by which they will be known to the callers during the linked call.

8. A unified call centre system according to claim 1, where the service provider is able to specify the time periods in which the service provider is able to take calls, the unified call centre system operable to refuse to link a call made by a caller outside of these time periods.

9. A unified call centre system according to claim 1, where the electronic voice communication device is one of the following: a personal branch exchange; a mobile phone; a voice over internet protocol phone; a fixed line telephone.

10. A unified call centre system according to claim 1, where the service provider lists a series of alternate contact devices and where, if the caller is not able to be linked with the service provider through the electronic voice communication device, the unified call centre system attempts to inform the service provider that a caller is seeking to contact them by sending communication messages to each of the alternate contact devices in rotation.

11. A unified call centre system according to claim 1, where the unified call centre system operates a website and information provided by each service provider and their respective unique identifier are accessible through the website.

12. A unified call centre system according to claim 1, where the service provider is required to verify their identity by communicating their personal identifier to the unified call centre system prior to receiving a linked call from a caller.

13. A unified call centre system according to claim 1, where, on termination of the linked call, the unified call centre system sends a communication message to the caller indicating the cost of the linked call to them.

14. A unified call centre system according to claim 1 where, on termination of the linked call, the unified call centre system sends a communication message to the service provider indicating the revenue generated from the linked call.

15. A unified call centre system according to claim 1, further including a feedback mechanism to allow the service provider to rate callers.

16. A unified call centre system according to claim 1, further including a feedback mechanism to allow callers to rate service providers.

17. A unified call centre system according to claim 15 or claim 16, where the caller or service provider, as appropriate, is able to provide feedback via the feedback mechanism through one of the following: a website; after the linked call; before the caller or service provider's next linked call.

18. A unified call centre system according to claim 16, where the unified call centre system operates a website and information provided by each service provider and their respective unique identifier are accessible through the website, and where the feedback on a service provider is also accessible through the website.

19. A unified call centre system according to claim 15 or 16, where, if the service provider or caller's feedback is less than a predetermined value, the caller or service provider, as appropriate, may no longer be able to make use of the unified call centre system.

20. A unified call centre system according to claim 1, where, if the caller is not able to be linked to the service provider immediately, the caller is communicated an estimate of the wait time until the service provider will be able to take their call.

21. A unified call centre system according to claim 1, where in equating the credit or air-time of the telecommunication carriers, the exchange system takes into account one or more of the following facts:
   currency differences and the impact of foreign currency exchange;
   devaluation of the credit or air-time resulting from promotional activities or the various products offered by the telecommunication carriers;
   call establishment and call termination fees levied by the respective telecommunication carriers; and
   the commission amount set or fee charged by the respective telecommunication carriers to allow for the transfer and receipt of the mobile phone credit, or, the transfer or receipt of the mobile phone credit.

22. A unified call centre system according to claim 1, where the exchange system further allows the service provider to convert the mobile phone credit received as payment for a call to an official country currency.

23. A server for a unified call centre system for multiple service providers,
   the server in communication with at least one database,
   the server having computer-executable instructions stored thereon that allows a service provider to register an account, the registration process requiring the service provider to enter a predetermined set of information, including
      at least one identifier for an electronic voice communication device,
      an additional identifier for an electronic communication device (voice or text) and a personal identifier, and
   where, after entry of the predetermined set of information, the server, through the computer-executable instructions, generates a unique identifier for the account and communicates the unique identifier and a return destination address for activating the account,
   the server thereafter operable to store the predetermined set of information in the at least one database and receive a communication from the service provider at the return destination address including their personal identifier such that,
   when a caller calls the server and communicates the unique identifier of the service provider to the unified call centre system, the server
      references the predetermined set of information stored in the at least one database,
      verifies one or more time periods in which the service provider is able to take calls, and
      operates to establish a call with the service provider by way of one of the at least one electronic voice communication devices and,
      if able to establish said call, link the caller through to the service provider,
   where the server is operable to require a payment by the caller for an appropriate charge set by the service provider on termination of the linked call, and
   where, when a method of payment designated by the caller is by mobile phone credit, the server operable through a credit exchange system to equate a credit or air-time of the caller's telecommunication carrier with a credit or air-time of the service provider's telecommunication carrier.

24. A server for a unified call centre system as claimed in claim 23, where the unique identifier is equal to, or derived from, the personal identifier.

25. A server for a unified call centre system as claimed in claim 23, where the caller is required to register themselves with the server prior to being able to make calls to service providers.

26. A server for a unified call centre system according to claim 25, where the information provided by the caller during the registration process is used by the server to impose access controls on the caller's use of the unified call centre system.

27. A server for a unified call centre system according to claim 25, where the caller is able to specify an alias by which they will be known to the service providers during the linked call.

28. A server for a unified call centre system according to claim 23, where the service provider is able to specify an alias by which they will be known to the callers during the linked call.

29. A server for a unified call centre system according to claim 23, where the service provider is able to specify the time periods in which the service provider is able to take calls, the server to refuse to link a call made by a caller outside of these time periods.

30. A server for a unified call centre system according to claim 23 where the service provider lists a series of alternate contact devices and where, if the caller is not able to be linked with the service provider through the electronic voice communication device, the server attempts to inform the service provider that a caller is seeking to contact them by sending communication messages to each of the alternate contact devices in rotation.

31. A server for a unified call centre system according to claim 23, where the server operates a website and information provided by each service provider and their respective unique identifier are accessible through the website.

32. A server for a unified call centre system according to claim 23, where the server is required to receive verification of the identity of the service provider in the form of a communication of their personal identifier prior to receiving a linked call from a caller.

33. A server for a unified call centre system according to claim 23, where, on termination of the linked call, the server sends a communication message to the caller indicating the cost of the linked call to them.

34. A server for a unified call centre system according to claim 23, where, on termination of the linked call, the server sends a communication message to the service provider indicating the revenue generated from the linked call.

35. A server for a unified call centre system according to claim 23 further including a feedback mechanism to allow the service provider to rate callers.

36. A server for a unified call centre system according to claim 23, further including a feedback mechanism to allow callers to rate service providers.

37. A server for a unified call centre system according to claim 23, where, if the service provider or caller's feedback is less than a predetermined value, the server may prevent the caller or service provider, as appropriate, from making use of the unified call centre system.

38. A server for a unified call centre system according to claim 23 where, if the server is not able to link the caller to the service provider immediately, the server communicates to the caller an estimate of the wait time until the service provider will be able to take their call.

39. A non-transitory computer readable medium having stored thereon computer-executable instructions, which when executed on a computer system for a unified call center, perform a method comprising:
    allowing a service provider to register an account the registration process requiring the service provider to enter a predetermined set of information, including
        at least one identifier for an electronic voice communication device,
        an additional identifier for an electronic communication device (voice or text) and
        a personal identifier, and where,
    after entry of the predetermined set of information by the service provider, generating a unique identifier for the account and communicating the unique identifier and a return destination address for activating the account,
    activating the service provider's account on receipt of a communication from the service provider at the return destination address including their personal identifier and storing the predetermined set of information in the at least one database,
    upon receipt of a communication from a caller specifying the unique identifier of a service provider, referencing the stored predetermined set of information,
    verifying one or more time periods in which the service provider is able to take calls,
    establishing a call with the service provider by way of one of the at least one electronic voice communication devices,
    upon establishing said call, linking the caller through to the service provider,
    requiring the caller to make a payment of an appropriate charge set by the service provider on termination of the linked call, and
    where, when a method of payment designated by the caller is by mobile phone credit, equating, through a credit exchange system, a credit or air-time of the caller's telecommunication carrier with a credit or air-time of the service provider's telecommunication carrier.

40. A non-transitory computer readable medium according to claim 39, wherein the method further comprises obtaining registration details from a caller prior the caller being able to make calls to service providers.

41. A non-transitory computer readable medium according to claim 40, wherein the method further comprises using the information provided by the caller during the registration process to impose access controls on the caller's use of the unified call centre system.

42. A non-transitory computer readable medium according to claim 39, wherein the method further comprises, upon the service provider specifying the time periods in which the service provider is able to take calls, refusing to link a call made by a caller outside of these time periods.

43. A non-transitory computer readable medium according to claim 39, where the method further comprises recording a list of alternate contact devices and where, if the caller is not able to be linked with the service provider through the electronic voice communication device, attempting to inform the service provider that a caller is seeking to contact them by sending communication messages to each of the alternate contact devices in rotation.

44. A non-transitory computer readable medium according claim 39 wherein the method further comprises generating and operating a website having information provided by each service provider and their respective unique identifier accessible therefrom.

45. A non-transitory computer readable medium according to claim 39, wherein the method further comprises requiring the service provider to provide verification of their identity in the form of a communication of their personal identifier prior to receiving a linked call from the caller.

46. A non-transitory computer readable medium according to claim 39, wherein, the method further comprises sending a communication message to the caller indicating the cost of a linked call upon termination of the linked call.

47. A non-transitory computer readable medium according to claim 39, wherein the method further comprises sending a communication message to the service provider indicating the revenue generated from a linked call upon the termination of the linked call.

48. A non-transitory computer readable medium according to claim 39, wherein the method further comprises allowing the service provider to rate callers through a feedback mechanism.

49. A non-transitory computer readable medium according to claim 39, wherein the method further comprises allowing callers to rate service providers through a feedback mechanism.

50. A non-transitory computer readable medium according to claim 48 or 49, wherein the method further comprises, if the feedback is less than a predetermined value, preventing the caller or service provider, as appropriate, from making use of the unified call centre system.

51. A non-transitory computer readable medium according to claim 39 wherein the method further comprises, if the caller is not able to be linked to the service provider immediately, communicating to the caller an estimate of the wait time until the service provider will be able to take their call.

* * * * *